United States Patent
Peterson

(10) Patent No.: US 8,370,856 B2
(45) Date of Patent: Feb. 5, 2013

(54) COMPUTER SYSTEM WITH CONTROLLER KERNEL AND REMOTE DESKTOP

(75) Inventor: David A. Peterson, Cazenovia, NY (US)

(73) Assignee: FH Innovations, Ltd, Markham, Ontario (CA)

( * ) Notice: Subject to any disclaimer, the term of this patent is extended or adjusted under 35 U.S.C. 154(b) by 569 days.

(21) Appl. No.: 12/613,312

(22) Filed: Nov. 5, 2009

(65) Prior Publication Data

US 2010/0115532 A1 May 6, 2010

Related U.S. Application Data

(60) Provisional application No. 61/111,608, filed on Nov. 5, 2008.

(51) Int. Cl.
*G06F 13/00* (2006.01)
*G06F 9/46* (2006.01)
*G06F 15/16* (2006.01)

(52) U.S. Cl. ......... 719/320; 718/107; 709/217; 709/219

(58) Field of Classification Search .................. None
See application file for complete search history.

(56) References Cited

U.S. PATENT DOCUMENTS

| | | | |
|---|---|---|---|
| 7,412,702 B1 * | 8/2008 | Nelson et al. ...................... | 718/1 |
| 7,730,157 B2 * | 6/2010 | Baratto et al. ................ | 709/217 |
| 8,028,040 B1 * | 9/2011 | Hobbs et al. ................... | 709/219 |
| 8,132,185 B2 * | 3/2012 | Ben-Yehuda et al. ......... | 719/320 |
| 2003/0037032 A1 * | 2/2003 | Neece et al. ....................... | 707/1 |
| 2005/0144646 A1 * | 6/2005 | Lecrom et al. .................. | 725/100 |
| 2006/0168134 A1 * | 7/2006 | Berger et al. ................. | 709/219 |
| 2008/0034377 A1 * | 2/2008 | Vo et al. ........................ | 719/320 |
| 2008/0155169 A1 * | 6/2008 | Hiltgen et al. .................... | 711/6 |
| 2009/0083450 A1 | 3/2009 | Peterson | |
| 2009/0083630 A1 | 3/2009 | Peterson | |
| 2009/0083829 A1 | 3/2009 | Peterson | |
| 2009/0248802 A1 * | 10/2009 | Mahajan et al. .............. | 709/204 |
| 2009/0300250 A1 * | 12/2009 | Weissman ..................... | 710/260 |
| 2009/0300645 A1 * | 12/2009 | Devine et al. ................. | 718/107 |
| 2011/0047476 A1 * | 2/2011 | Hochmuth et al. ........... | 715/744 |

OTHER PUBLICATIONS

U.S. Appl. No. 60/973,923, filed Sep. 20, 2007, Peterson.
Remote desktop software from Wikipedia, Oct. 27, 2009 http://en.wikipedia.org/wiki/Remote_desktop_software.

* cited by examiner

*Primary Examiner* — Andy Ho
*Assistant Examiner* — Tuan Dao
(74) *Attorney, Agent, or Firm* — George R. McGuire; Bond Schoeneck & King

(57) ABSTRACT

Remote desktop software for use with guest operating systems that run on a controller kernel. Also, remote desktop software that can be used to remotely view and/or manipulate multiple containerized guest operating systems that run on a single computer. The multiple, containerized operating systems preferably run on a controller kernel. Alternatively, the multiple containerized operating system may be controlled to run on the single computer by other software, such as a hypervisor.

15 Claims, 6 Drawing Sheets

US 8,370,856 B2

COMPUTER SYSTEM WITH CONTROLLER KERNEL AND REMOTE DESKTOP

RELATED APPLICATION

The present application claims priority to U.S. provisional patent application No. 61/111,608, filed on 5 Nov. 2008; all of the foregoing patent-related document(s) are hereby incorporated by reference herein in their respective entirety(ies).

BACKGROUND OF THE INVENTION

1. Field of the Invention

The present invention relates to a computer system and more particularly to a computer system including a computer set (see DEFINITIONS section) that provides operating system type capabilities for multiple terminals (see DEFINITIONS section).

2. Description of the Related Art

In some conventional computer systems, multiple operating systems run on a single set of processing hardware of a single computer. For example, in some conventional computer systems, a piece of software called a "hypervisor" controls the running of multiple operating systems, which operating systems are sometimes called "virtual machines." In some conventional hypervisor-and-virtual-machine computer systems, the virtual machines are "containerized" in that each virtual machine runs substantially independently of the other virtual machine(s) that are run by the common hypervisor. The hypervisor effects its control of the virtual machines by "virtualizing," or, in other words, emulating the actual, physical resources of the hardware upon which the hypervisor runs. By virtualizing the actual resources, the hypervisor can actually communicate with various resources of the computer (see DEFINITIONS section), on behalf of each containerized virtual machine, in series, which is to say, in some sort of time division multiplexed manner. At the same time, because the hypervisor communicates with the various, containerized virtual machines through code emulating virtualized hardware, each virtualized machines has no way of detecting the sharing of computer resources. Because of this, the virtualized machine operating systems do not need to be equipped to deal with the fact that they are sharing computer resources. This means that standard, pre-existing operating systems, such as WINDOWS operating systems or LINUX operating systems, may be used for each virtual machine operating system. ("WINDOWS" is used as a trademark of the Microsoft Corporation and may be subject to commonlaw and/or trademark-registration-based trademark rights in various jurisdictions throughout the world.)

Because hypervisors virtualize computer resources, they tend to require a lot of code and processing power in order to fully and accurately emulate the specific resources that they emulate. Furthermore, a given piece of hypervisor software must include code to emulate all of the resources of the computer system upon which it runs. If the hypervisor includes virtualization code for resources that its computer system does not have, then that is an inefficiency because those code portions cannot be allowed to be used by the virtual machines running on the hypervisor. Of more concern is the fact that the hypervisor might be missing code to run certain resources. In fact, if there is too bad of a mismatch between the resources that the hypervisor has code portions to emulate, and the actual resources of the computer system upon which it runs, then the computer system will be inoperable. In this sense, hypervisors tend to be either inefficient (that is, lots of extra code portions), or else inflexible and unrobust (that is, unable to accommodate a wide variety of computer systems having different combinations of resources).

The named inventor of the present application has developed a different kind of computer system for running multiple operating systems and/or multiple, containerized operating systems on a single computer. According to this system, the multiple operating systems communicate more directly with the actual resources of the computer system under the control of a module (for example, a piece of software) called a "controller kernel." The concept of the controller kernel and various preferred embodiments of the computer systems utilizing such a controller kernel are more fully described in the following patent application documents: (i) Ser. No. 12/234,131 (filed Sep. 19, 2008 and published as publication number 2009-0083829 A1 on Mar. 26, 2009); (ii) Ser. No. 12/234,158 (filed Sep. 19, 2008 and published as publication number 2009-0083630 A1 on Mar. 26, 2009); (iii) Ser. No. 12/234,223 (filed Sep. 19, 2008 and published as publication number 2009-0083450 A1 on Mar. 26, 2009); and (iv) U.S. provisional patent application No. 60/973,923, filed on Sep. 20, 2007 (collectively, "Controller Kernel Background Documents"). The Controller Kernel Background Documents are hereby incorporated by reference in their respective entireties to the fullest extent allowed by law.

Some conventional computer systems include remote desktop software. As explained in the Wikipedia: "In computing, the term remote desktop refers to a software or an OS feature allowing graphical applications to be run remotely on a server, while being displayed locally. Remote desktop applications have varying features. Some allow attaching to an existing user's session (i.e. a running desktop) and 'remote controlling' it in front of the user's eyes. Taking over a desktop remotely is a form of remote administration. It can also be explained as remote control of a computer by using another device connected via the internet or another network. This is widely used by many computer manufacturers (DELL, HP etc.) and large businesses' help desk for technical troubleshooting of their customers. Windows XP, Vista, and Server 2003/2008 include Remote Desktop Services; Apple includes Screen Sharing with Mac OS X but sells its Apple Remote Desktop separately. Various professional third-party, open source and freeware remote desktop applications exist which are cross-platform and work various versions of Windows, Mac, and UNIX/Linux/BSD. The quality, speed and functions of any remote desktop protocol are based on the system layer where the graphical desktop is redirected. Software such as PC Anywhere, VNC and others use the top software layer to extract and compress the graphic interface images for transmission. Other products such as Microsoft RDP, Graphon GO-Global and others use a kernel driver level to construct the remote desktop for transmission." (See, http://en.wikipedia.org/wiki/Remote_desktop_software version as of 27 Oct. 2009.)

Some remote desktop protocols include: (i) Virtual Network Computing (VNC), a cross-platform protocol; (ii) Remote Desktop Protocol (RDP), a Windows-specific protocol featuring audio and remote printing; (iii) Remote Frame Buffer Protocol (RFB), a frame buffer level cross-platform protocol that VNC is based on; (iv) Apple Remote Desktop Protocol (ARD), the original protocol for Apple Remote Desktop on Mac OS X machines; (v) NX technology (NX), a cross-platform protocol including audio and remote printing; (vi) Independent Computing Architecture (ICA), a proprietary protocol designed by Citrix Systems; (vii) X Window System (X11), a well-established cross-platform protocol mainly used for displaying local applications, but which can also be used remotely; (viii) Rapid X Protocol (RXP), the Graphon GO-Global protocol to communicate between the host and the client; (viii) Appliance Link Protocol (ALP), a Sun Microsystems-specific protocol featuring audio, remote printing, remote USB and accelerated video. However, it is believed that none of these remote desktop protocols are sent from or received by a controller kernel, and more specifically, none of them are sent from or received by a controller kernel having an interrupt loop. It is further believed that none of them encapsulate (or tunnel) frame buffers in their native form (see DEFINITIONS section) for the purposes of remote desktop software functionality.

Description Of The Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

One aspect of the present invention is directed to remote desktop software (see DEFINITIONS section) for use with guest operating systems that run on a controller kernel (see DEFINITIONS section). For example, remote desktop software according to this aspect of the present invention may run on a computer belonging to an Information Technology ("I.T.") employee who then uses it to view and/or manipulate the desktop of a remote computer that has: (i) a controller kernel; (ii) a guest operating system; (iii) remote desktop software programmed to communicate over a computer network with the remote desktop software on the I.T. employee's computer; and (iv) a frame buffer module included in the controller kernel. The frame buffer module sends and receives frame buffers corresponding to remote desktop information, with the frame buffers being in their native form (see DEFINITIONS section). Preferably, the frame buffer module includes an encapsulation sub-module for wrapping the native form frame buffers in a protocol suitable for direct communication in a tunneling fashion over a communication network, such as the TCP-IP protocol. Preferably, the frame buffer module further includes a de-encapsulation sub-module for unwrapping the native form frame buffers from a protocol suitable for receipt in a tunneling form from a communication network, such as the TCP-IP protocol.

The remote desktop software on the remote computer may or may not be identical to that installed on the I.T. employee's machine. For example, if the software is identical, then there may be a system of password protection put into place so that each user (that is, the I.T. employee and the remote computer user) only gets access to suitable respective functionality. For example, the password protection may be set so that the I.T. employee, when logged into the remote desktop software, can observe other desktops (such as, the desktop of the remote computer), but the remote computer user cannot observe anybody else's desktop. As still a further alternative, a user may have privileges to view certain desktops, but not others.

Another aspect of the present invention is directed to remote desktop software (see DEFINITIONS section) that can be used to remotely view and/or manipulate multiple containerized guest operating systems that run on a single computer. According to this aspect, the multiple, containerized operating systems preferably run on a controller kernel. Alternatively, the multiple containerized operating system may be controlled to run on the single computer by other software, such as a hypervisor.

Various embodiments of the present invention may exhibit one or more of the following objects, features and/or advantages:

(i) allows remote viewing and/or manipulation of guest operating systems that run on a controller kernel;

(ii) allows remote viewing and/or manipulation of guest operating systems for I.T. purposes;

(iii) facilitates I.T. pushdown;

(iv) allows remote viewing and/or manipulation of guest operating systems for educational purposes;

(v) allows remote viewing and/or manipulation of guest operating systems that are used in conjunction with thin clients (see DEFINITIONS section) and/or dumb terminals (see DEFINITIONS section);

(vi) communication of remote desktop related frame buffers in their native form results in more efficient remote desktop related communication between and/or within computers; and/or (vii) communicating native form frame buffers by tunneling over a communication network is more efficient than tunneling other forms of remote desktop software related communications.

According to a first aspect of the present invention, a computer system includes a computer resources set, a controller kernel and a first guest operating system. The computer resources set comprises a computer processing resources set. The controller kernel is stored and programmed to run on the computer processing resources set The first guest operating system is programmed and stored to run under the control of the controller kernel. The computer resources set defines a native form for instructions that the computer resources set receives from and sends to operating systems. The controller kernel comprises an instruction communication module. The instruction communication module is programmed so that the instructions communicated through the controller kernel between the first guest operating system and the computer resources set remain in the native form. The controller kernel comprises a frame buffer module that is programmed: (i) to capture selected output frame buffers that include remote desktop information in order to send the output frame buffers out over a communication network; and (ii) to receive selected input frame buffers from the communication network and output the received input frame buffers to the instruction communication module.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
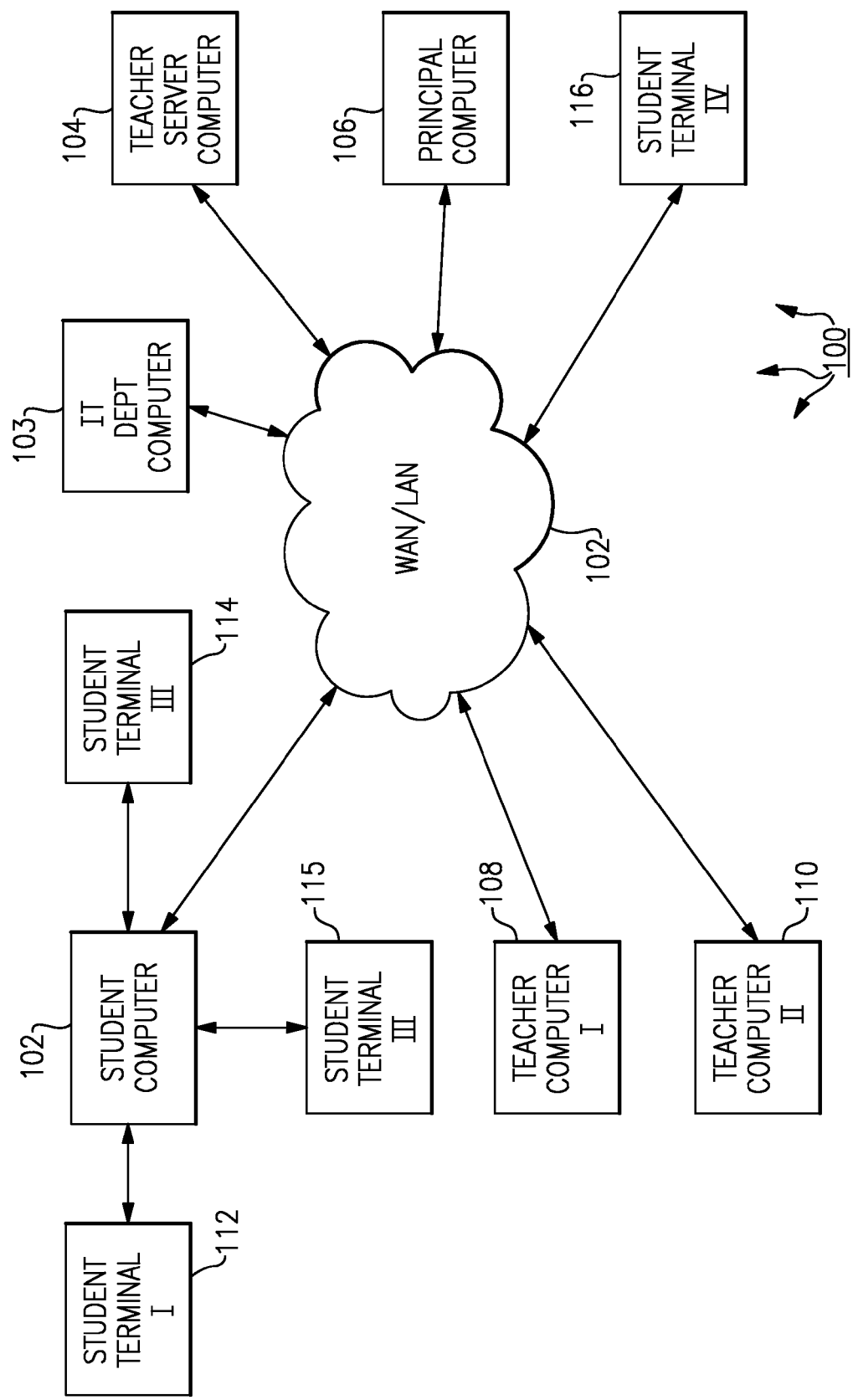
FIG. 1 is a schematic view of a first embodiment of a computer system suitable for use with remote desktop software according to the present invention.

FIGS. 1 to 6 shows computer system 100, which is suitable for use with remote desktop software according to the present invention, and which be used to show some of the many and various ways that remote desktop software according to the present invention may be deployed and used. System 100 is intended for use by a school including an IT employee, a principal, two teachers and four students. As will be discussed: (i) one of the two teachers uses a LINUX operating system, and the other teacher uses a Windows operating system; (ii) the IT department is given access to view and/or manipulate all computers in the system using the remote desktop software; (iii) the principle is given access to view and/or manipulate all computers in the system using the remote desktop software; (iv) the teachers are given view-only access to all student operating systems using the remote desktop software; (v) none of the students are allowed view or manipulation access to any other computers on the system; (vi) one of the students is new and her dumb terminal and guest operating system are still in the process of being set up; and (vii) another one of the students has a medical condition and works remotely from her home using her dumb terminal As shown in FIG. 1, system 100 includes: WAN/LAN communication network 102; student computer 102; IT department computer 103; teacher server computer 104; principal computer 106; teacher computer I 108; teacher computer II 110; student terminal I 112; student terminal II 114; student terminal III 115; and student terminal IV 116. As shown in FIG. 1, student computer 102; IT department computer 103; teacher server computer 104; principal computer 106; teacher computer I 108; teacher computer II 110; and student terminal IV can communicate with each other through network 102. As shown in FIG. 1, student terminal I 112; student terminal II 114; student terminal III 115 are connected directly to student computer. As will be discussed below, student computer 102 provides the operating systems and substantially all of the computer processing functionality for the student terminals, which are in the form of dumb terminals. Student terminal IV 116 is connected through student computer 102 only through the communication network because the student computer is located in the school building, and student terminal IV is allocated to a student who learns remotely from home due to a medical condition. Teacher computer I 108 and teacher computer II 110 are each in the form of a thin client. As will be discussed below, teacher server computer 104 provides the operating systems and most of the computer processing functionality for the thin client teacher computers.

Figure 2:
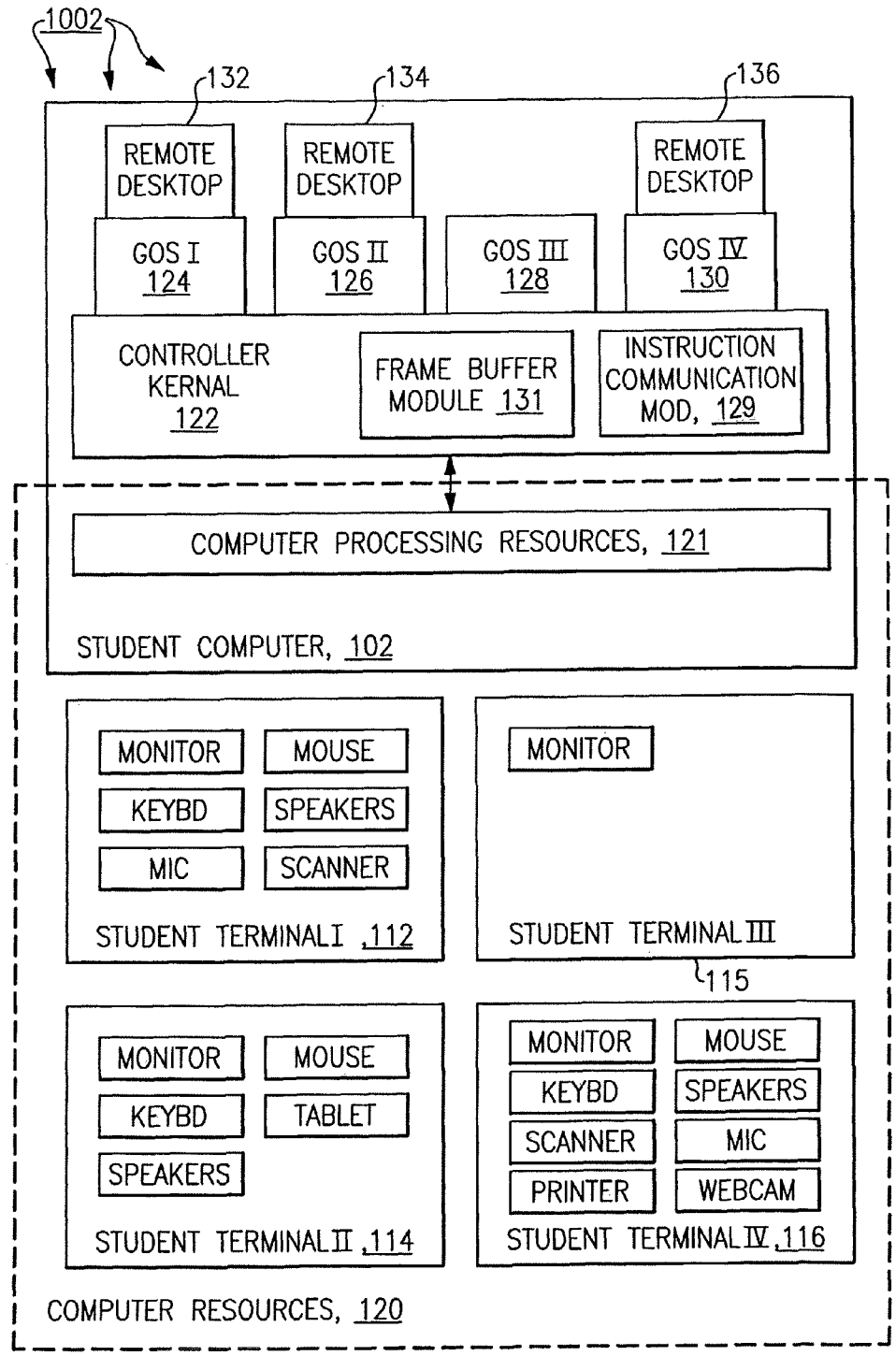
FIG. 2 is a schematic view of a portion of the first embodiment computer system.

FIG. 2 shows the student computer sub-system of computer system 100. Sub-system 100a includes: student computer 102; student terminal I 112; student terminal II 114; student terminal III 115; and student terminal IV 116. Student computer 102 includes: computer processing resources 121; controller kernel 122; guest operating system ("GOS") I 124; GOS II 126; GOS III 128; instruction communication module 129; GOS IV 130; and three remote desktop software sets 132, 134, 136. Controller kernel 122 includes frame buffer module 131. Student terminal I includes: a monitor output device; a keyboard input device; a mouse input device; a microphone input device; an audio speaker output device and a scanner input device (these devices are not separately numbered for clarity of illustration purposes). Student terminal II includes: a monitor output device; a keyboard input device; a mouse input device; a tablet input device; and an audio speaker output device (these devices are not separately numbered for clarity of illustration purposes). Student terminal III includes only a monitor output device (this device is not separately numbered for clarity of illustration purposes) because this terminal is still in the process of being set up for the new student. Student terminal IV includes: a monitor output device; a keyboard input device; a mouse input device; a microphone input device; an audio speaker output device; a scanner input device; a printer output device; and a webcam input device (these devices are not separately numbered for clarity of illustration purposes). The student IV is equipped with many input/output devices because this student learns remotely from home.

FIG. 2 shows a couple of features that figure prominently in certain embodiments of the present invention. One of these features is the multiple, containerized guest operating systems 124, 126, 128, 130. Even though student computer 102 is a single computer with a single set of computing resources (such as, for example, a central processing unit), this single computer runs four operating systems, all of which run substantially independently of each other. Another feature is the fact that these guest operating systems run on a common controller kernel. Information on some of the ways various embodiments may be made and/or used is set forth in the Controller Kernel Background Documents. Preferably, the controller kernel is a POSIX kernel. Even more preferably, it is a LINUX kernel. Preferably, it includes an idle loop that temporarily stores trapped guest-to-hardware instructions and trapped hardware-to-guest instructions, relating to a given GOS during periods when the given GOS is pre-empted (and other GOSs sharing the controller kernel are not pre-empted).

As shown in FIG. 2, GOS I, GOS II and GOS IV have respective remote desktop hardware according to the present invention running on them. This means that operations of these GOSs can be remotely viewed and/or manipulated despite the fact that there are multiple containerized operating systems and despite the fact that the guest operating systems are running on and controlled by a controller kernel. This allows students I, II and IV to be: (i) assisted in their I.T. issues by the I.T. employee; (ii) monitored and controlled in computer operations by the principal (who has view and manipulate access); and (iii) monitored by their teachers (who have view only access). GOS III, which is allocated to student III, does not yet have remote desktop software installed on his GOS III yet because he is a new student and his computer set-up is still in the process of being assembled. Although remote desktop software sets 132, 134 and 136 run on their respective operating systems, the software could be programmed integrally into the GOS itself.

The remote desktop hardware 132, 134, 136 works in conjunction with frame buffer module 131 which resides in controller kernel. Preferably, it is written in POSIX, just like the rest of the controller kernel. Even more preferably it is written in LINUX. Preferably the frame buffer module takes native form frame buffer data from and feeds native form frame buffer data to an interrupt loop (not shown) that is implemented as a primary feature of the controller kernel. As will be further discussed below in connection with FIG. 8, the role of the frame buffer module is to capture, encapsulate and send over a communication network remote desktop functionality related frame buffers as they are being sent through the controller kernel, and also to receive, de-encapsulate and supply to the controller kernel remote desktop functionality related frame buffers that are received through the communication network from remote machines.

In operation, the controller kernel: (i) passes GOS-to-computer-resource instructions from each GOS 124, 126, 128, 130 to computer resources 120; (ii) passes computer-resource-to-GOS instructions to each GOS 124, 126, 128, 130 from computer resources 120; and (iii) sends any and all appropriate signals to the GOSs and/or the computer resources as needed to avoid conflicts and/or delay based errors (such as time out errors). Communication to student terminals I, II and III is local and may be effected by any appropriate local data communication scheme, wired and/or wireless, now known or to be developed in the future. For example, USB cables may be used to connect the various resources of terminals I, II and III to computer processing resources 121. As shown in FIG. 1, student terminal IV is remote from student computer 102, and all data must be communicated therebetween through network 102.

Although four (4) GOSs are shown in FIG. 2, there may be fewer or more GOSs running on a single computer and single controller kernel. The GOSs may be all the same (for example, Windows Vista), or they all be different. The controller kernel may give each of the GOSs similar access to computer processing resources 121, or it may give some GOSs better access than others. For example, idle loop(s) may be designed to give GOS IV relatively more access to computer processing resources 121 because this is a remote dumb terminal, and is therefore more resource intensive to run than a local remote terminal, such as those run by GOSs I, II and III. The computer processing resources are preferably primarily in the form of a set of processing hardware including a single processor, but may include hardware, software and/or firmware in any combination now known or to be developed in the future.

Figure 3:
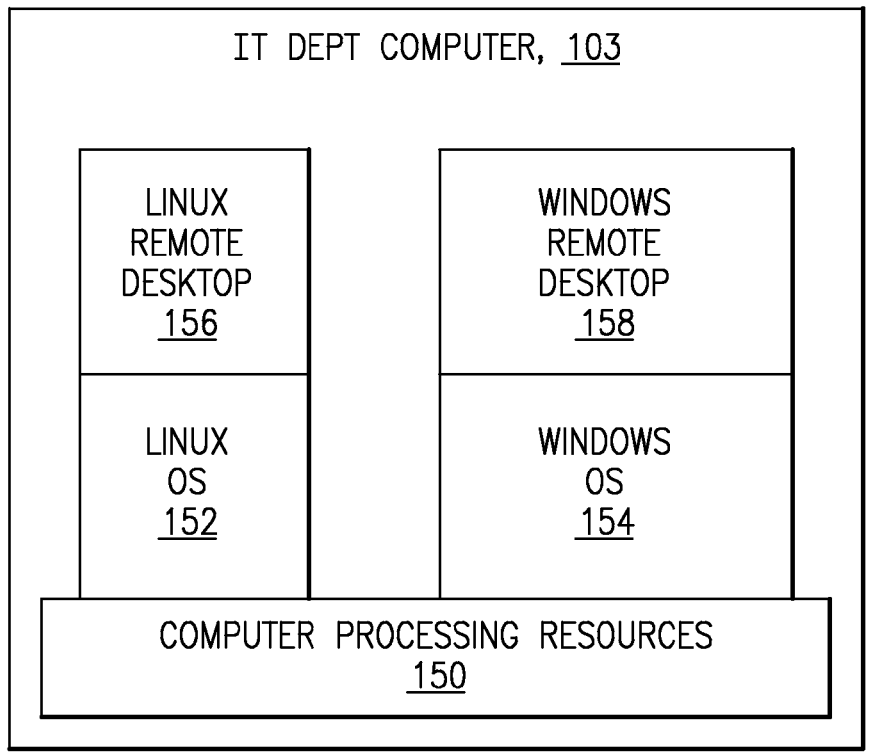
FIG. 3 is a schematic view of a portion of the first embodiment computer system.

FIG. 3 shows IT department computer 103 including: computer processing resources 150; LINUX OS 152, Windows OS 154; LINUX-compatible remote desktop software 156; and Windows-compatible remote desktop software 158. In system 100, the Windows compatible software 158 is identical to the remote desktop software sets 132, 134, 136 discussed above. The IT department computer is a single computer, which is configured as a dual boot computer, meaning that it can run either its LINUX OS 152 or its Windows OS 154. The IT department computer is set up this way because the IT department computer uses remote desktop software according to the present invention to view and manipulate remote Windows OSs and remote LINUX OSs, so it is better for the IT employee to be able to choose the operating system on the IT department that will best suit her needs for any given IT task. the dual boot system allows this flexibility. Alternatively, the IT department computer could have more or fewer OSs running on it. As shown in FIG. 3, the It department computer OSs 152, 154 run directly on computer processing resources 150 (sometimes known as "the bare metal"), and there is no controller kernel or hypervisor type hardware in this machine. Alternatively, there could be because the remote desktop software according to the present invention is programmed to be able to run through a controller kernel and/or hypervisor. In operation, the IT employee uses the LINUX-compatible remote desktop software 156 or the Windows-compatible remote desktop software 158 to view and manipulate remote desktops, depending upon which of the IT department computer's OSs is booted up at any given time.

It is noted that IT department computer 103 has no frame buffer module (like frame buffer module 131) because it has no controller kernel. Instead, remote desktop related communications that are to be sent and/or received for use in the various remote desktop software 156, 158 of IT department computer 103 must be encapsulated (to be sent by tunneling) or de-encapsulated (received from tunneling) in the remote desktop software 156, 158 itself. However, because the remote desktop software runs on an operating system and through an API, this generally means that the remote desktop communications will be processed in a less efficient manner (like remote desktop communications are processed in prior art remote desktop software). In other words, the increased involvement of high level (that is running on top of an operating system) applications bogs down the remote desktop related communications to some degree. The way in which the remote desktop software running on the operating system (as opposed to the frame buffer module included in the controller kernel) handles the encapsulation and/or de-encapsulation of remote desktop related communications will be further discussed below in connection with FIG. 7.

Figure 4:
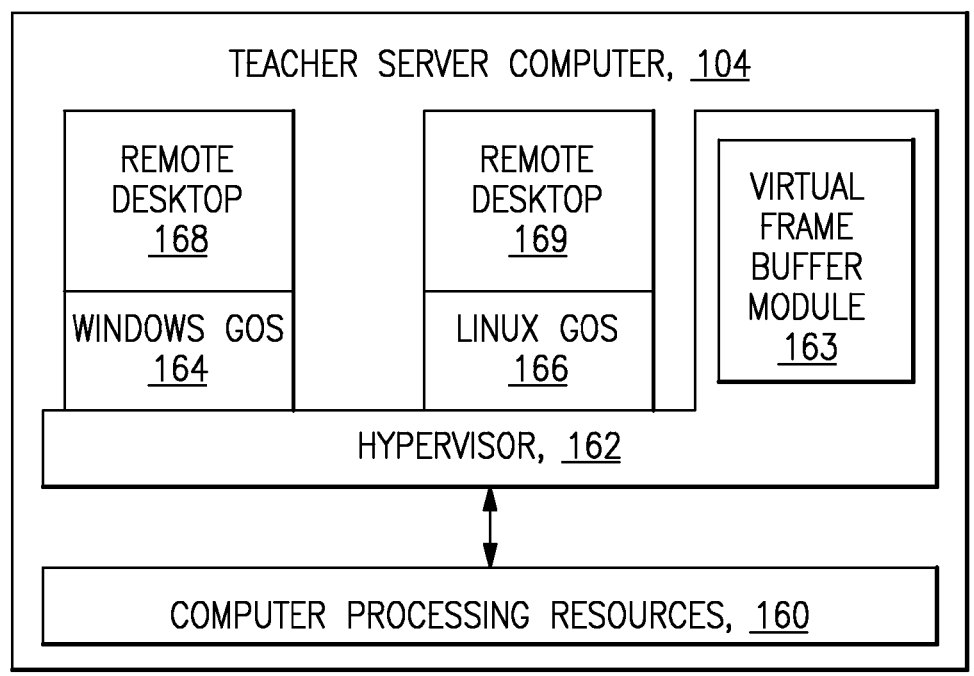
FIG. 4 is a schematic view of a portion of the first embodiment computer system.

FIG. 4 shows teacher server computer 104 including: computer processing resources 160; hypervisor 162; Windows GOS 164; LINUX GOS 166; remote desktop software 168; and remote desktop software 169. The reason that there are two different operating systems is that one teacher prefers a Windows operating system environment and the other teacher prefers a LINUX operating system environment, and the school has seen fit to accommodate these teacher preferences. Window GOS is used to run thin client teacher computer 108 (see FIG. 1), and the LINUX GOS is used to run thin client teacher computer 110 (see FIG. 1). Communications between these operating systems and their respective thin clients are effected through network 102 (see FIG. 1). It is noted that teacher server computer 104 uses a hypervisor 162 in order to control its multiple, concurrent, containerized operating systems 164, 166, even though a controller kernel is generally preferred. This shows how the present invention may not be strictly limited to controller kernel based embodiments.

Hypervisor 162 includes a virtual frame buffer 163 for capturing and encapsulating and/or de-encapsulating and directing to remote desktop software remote desktop software related communications. However, the use of the hypervisor in helping to effect remote desktop related communications is generally considered to be less efficient than using a controller kernel and a frame buffer module, like frame buffer module 131, residing within a controller kernel.

Figure 5:
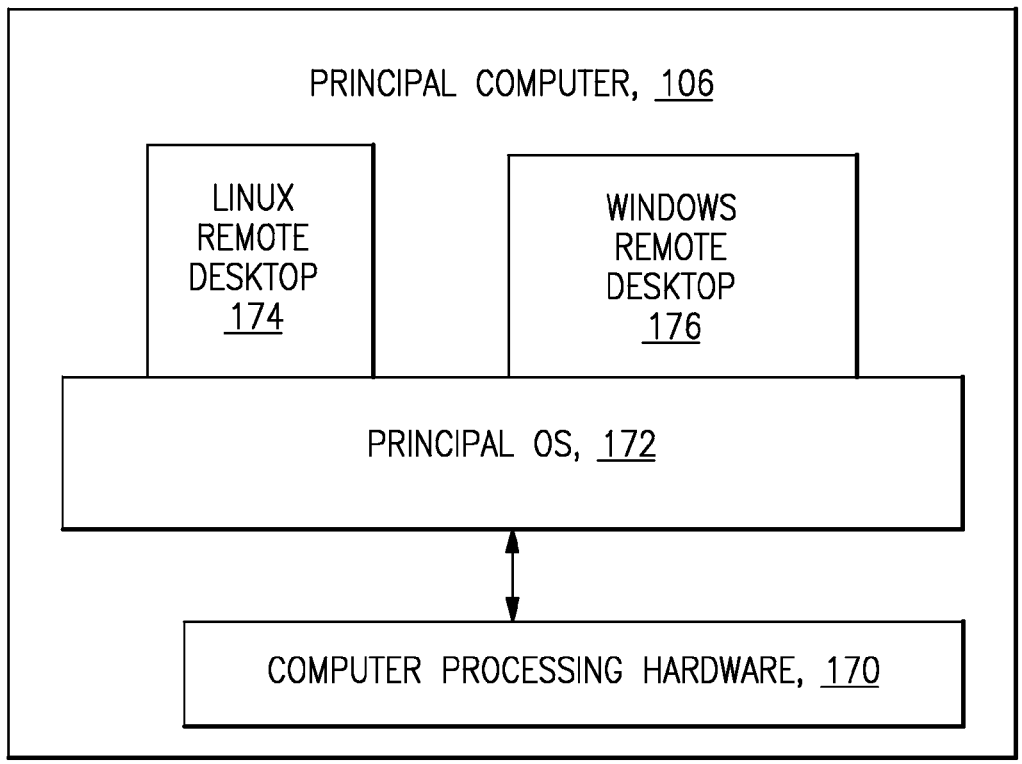
FIG. 5 is a schematic view of a portion of the first embodiment computer system.

FIG. 5 shows principal computer 106 including: computer processing hardware 170; principal OS 172; LINUX-compatible remote desktop software 174; and Windows-compatible remote desktop software 176. LINUX-compatible remote desktop software 174 is substantially identical to the LINUX-compatible remote desktop software 156 on IT department computer 103, discussed above. Windows-compatible remote desktop software 176 is substantially identical to the LINUX-compatible remote desktop software 158 on IT department computer 103, discussed above. Even though the principal has only a single operating system on her computer, she has both LINUX compatible and Windows compatible remote desktop software so that she can view and manipulate remote desktops generated by both types of operating systems. Because these embodiments 174, 176 of remote desktop software according to the present invention can run on operating systems that run directly on the bare metal, and do not have an intervening hypervisor and/or controller kernel, the principal can use this software on his hypervisorless, kernel-less machine. However, other embodiments within the scope of the present invention may be limited to running on GOSs that run on a controller kernel.

Figure 6:
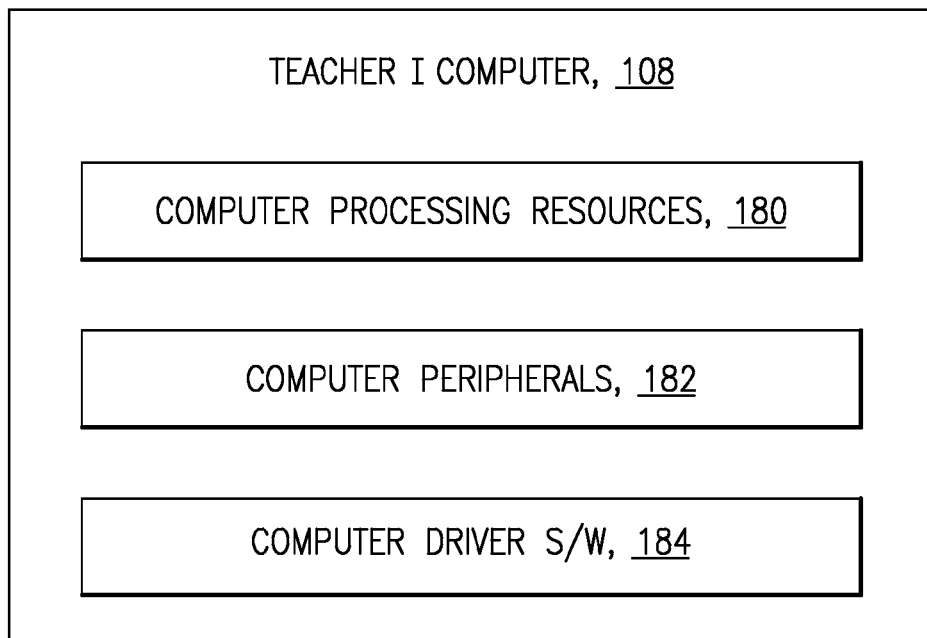
FIG. 6 is a schematic view of a portion of the first embodiment computer system.

FIG. 6 shows teacher I (thin client computer) 108 including computer processing resources 180; computer peripherals 182; and computer driver software 184. Because computer 108 is a thin client, it has some processing power beyond what is built into its peripheral devices, but not very much, and, in this embodiment, computer 108 I not locally running anything that could properly be termed as an operating system. Rather, the operating system that runs thin client computer is windows GOS 164 in teacher server computer 104, discussed above. The schematic of thin client computer 108 shows how the remote desktop software of the present invention is not limited to dumb terminals, such as student I to IV terminals, and full blown, proper computers, such as IT computer 103 and principal computer 16, but rather can be used in conjunction with any user workstation (now known or to be developed in the future) that falls anywhere between these two extremes. For example, in other embodiments, the operating system to run the teacher workstations, and the remote desktop software respectively associated with these containerized operating systems, might be distributed between the teacher server computer 104 and the respective thin clients.

Figure 7:
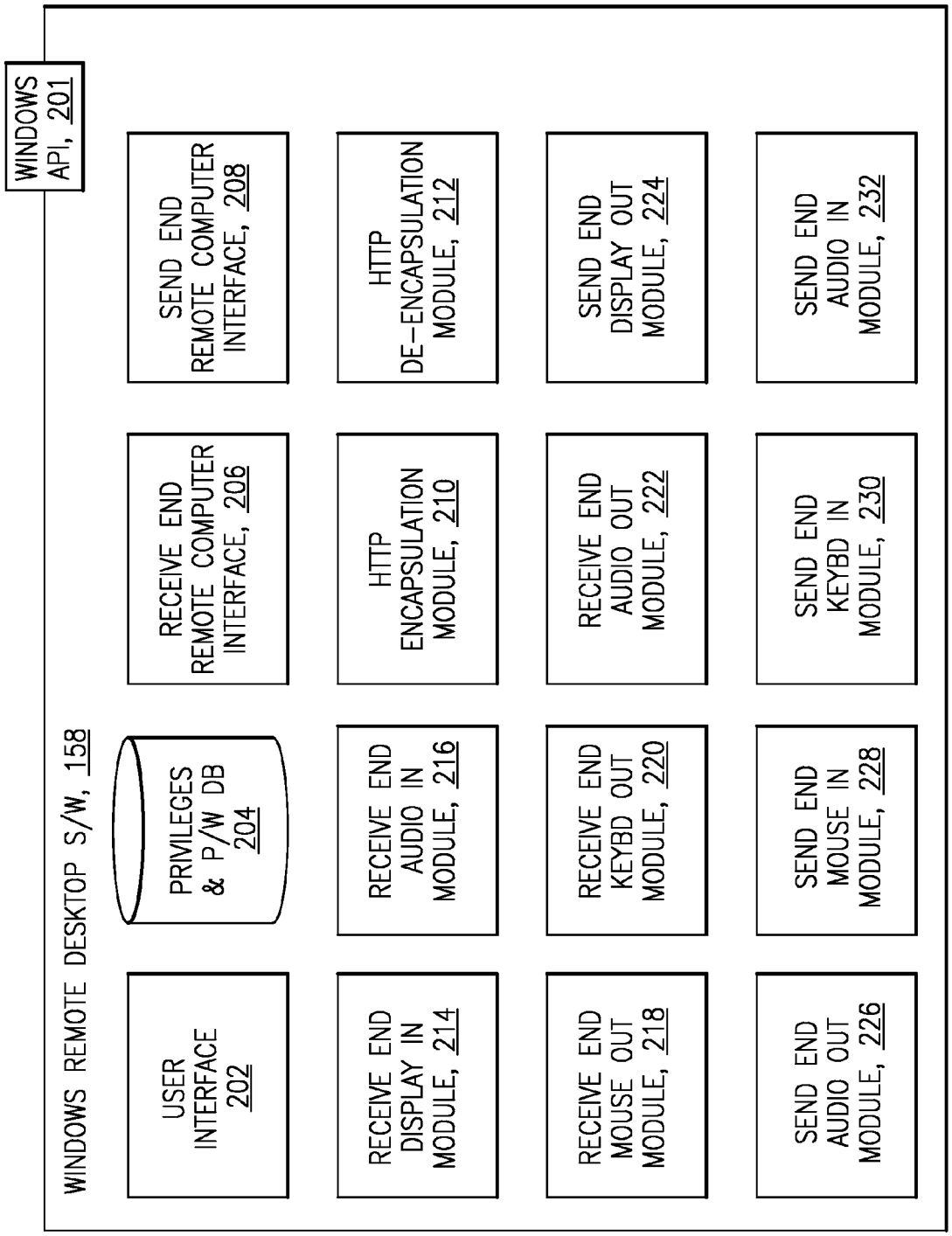
FIG. 7 is a schematic view of a first embodiment of remote desktop software according to the present invention.

FIG. 7 shows a schematic of Windows-compatible remote desktop software 158 according to the present invention. The LINUX-compatible versions 156, discussed above, except for the application programming interface (API) 201. Software 158 includes: Windows compatible API 201; user interface module 202; privileges and passwords database 204; receive end remote computer interface module 206; send end remote computer interface module 208; HTTP encapsulation module 210; HTTP de-encapsulation module 212; receive end display in module 214; receive end audio in module 216; receive end mouse out module 218; receive end keyboard out module 220; receive end audio out module 222; send end display out module 224; send end audio out module 226; send end mouse in module 228; send end keyboard in module 230; send end audio in module 232

The "receive end" modules deal with processing that occurs when the remote desktop software receives a desktop display from a remote machine. It is noted that even though the remote desktop software is receiving a display in this situation, it may also be sending other data to the remote machine, such as mouse clicks or keyboard strokes. The "send end" modules deal with processing that occurs when the remote desktop software sends a desktop display to a remote machine. It is noted that even though the remote desktop software is sending a display in this situation, it may also be receiving other data from the remote machine, such as mouse clicks or keyboard strokes.

Remote desktop software 158 communicates with other computers by tunneling using the TCP-IP and/or HTTP protocol. Preferably the remote desktop software 158 causes the operating system upon which it resides to send and/or receive native form frame buffers that correspond to the remote desktop related communications. As will be discussed below in connection with FIG. 8, these native form frame buffers are preferably taken from and/or supplied to the controller kernel by a frame buffer module which makes up a part of the controller kernel.

As a (generally less-efficient) alternative to the use of a frame buffer module residing in a controller kernel, as mentioned in the previous paragraph, when remote desktop software is going to send any sort of data out to remote desktop software on a remote machine, it may alternatively use HTTP encapsulation module 210 to encapsulate the data in an HTTP and/or TCP/IP protocol wrapper, so that the data may be tunneled to the remote machine through communication network 102 (see FIG. 1). Alternatively or additionally, other protocols may be used for tunneling of the remote desktop related data. Also as a (generally less-efficient) alternative to a frame buffer module in the controller kernel, HTTP de-encapsulation module receives data from remote desktop software running on remote machine(s) via receive end remote computer interface module 206 or send end remote computer interface module 208. The data unit by which data is encapsulated and communicated between remotely-located remote desktop software sets is preferably a frame buffer. It is noted that HTTP encapsulation and HTTP de-encapsulation modules 210, 212 are optional. However, if they are omitted from the remote desktop software, then the remote desktop software must be used with a controller kernel that includes a frame buffer module.

Figure 8:
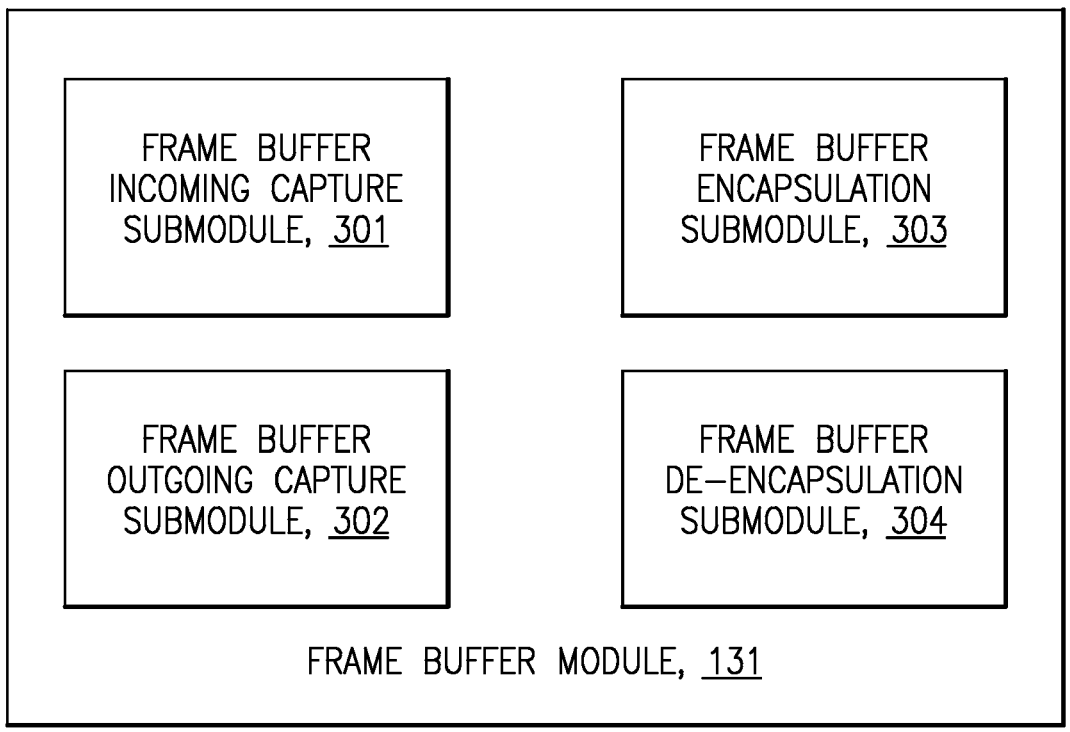
FIG. 8 is a schematic view of a frame buffer module according to the present invention.

FIG. 8 shows frame buffer module 131 including: frame buffer incoming capture sub-module 301; frame buffer outgoing capture module 302; frame buffer encapsulation module 303; and frame buffer de-encapsulation module 304. The frame buffer outgoing capture sub-module pulls selected frame buffers, in native form, from the controller kernel (for example, from an interrupt loop in the controller kernel) to be communicated over a communication network to remote desktop software at remote machine(s). The frame buffer encapsulation sub-module receives those native form frame buffers from the frame buffer outgoing capture module then encapsulates them (for example, in TCP-IP protocol) to be communicated by tunneling communication over a communication network to remote desktop software at remote machine(s). Alternatively, the frame buffer encapsulation sub-module may be omitted and the frame buffers may be sent in native form, so long as the communication network is structured and/or programmed to make such native form data communications.

The frame buffer de-encapsulation sub-module receives, from the communication network, network protocol (for example, TCP/IP protocol) communications by tunneling style communication from the remote desktop software of remote machines. The frame buffer de-encapsulation sub-module de-encapsulates the received network protocol communications to generate native form frame buffers corresponding to remote desktop related data. the frame buffer incoming capture sub-module sends these native form, remote desktop related frame buffers to the controller kernel for communication to a GOS and its remote desktop software. Alternatively, the frame buffer de-encapsulation sub-module may be omitted and the frame buffers may be directly received in native form, so long as the communication network is structured and/or programmed to make such native form data communications.

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Electrically Connected: means either directly electrically connected, or indirectly electrically connected, such that intervening elements are present; in an indirect electrical connection, the intervening elements may include inductors and/or transformers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Computer set: One or more computers located at one or more locations; a computer set may include, for example, a server computer, a communication network and a "dumb terminal" (see DEFINITIONS section.

Terminals: sometimes called workstations, these have sufficient user input and output devices so that a user can work at the terminal as if the user is working at a computer, regardless of how much computer processing capability exists within the terminal itself; terminals include, but are not limited to, dumb terminals and thin clients.

Dumb terminals: A terminal with substantially no computer processing capability; however, it is noted that a terminal including a standard LCD monitor and a standard modern computer keyboard would be considered as a dumb terminal even if either or both of these devices turned out to have some processing power to perform their respective functions as a display device and a user input device.

Thin client: A terminal with some computer processing power, but much less than a typical personal computer; for example, a thin client might have a processor for the purposes of, and only sufficient to, de-encapsulating and encapsulating data received from a network in a network protocol and data transmitted to the network in network protocol.

Resources of the computer: May includes, but is not necessarily limited to internal read only memory, read only removable memory, random access internal memory, cache memory, processing hardware, network communications hardware and/or any kind of peripheral devices now known or to be developed in the future.

Remote desktop software: Any software, OS feature or module within a controller kernel that allows graphical applications to be run through a communication network on a "sender" computer while being displayed on a "receiver" computer that communicates with the sender computer through the communication network.

Remote desktop information: information of the type typically communicated over a communication network between remote desktop software.

Controller kernel: Includes, but is not necessarily limited to POSIX kernels that include an idle loop for routing native form instructions in a controlled manner Native form: a form of instructions that can be operatively received by and/or is output from processing hardware directly and without any sort of translation or modification to form by software running on the hardware; generally speaking, different processing hardware types are characterized by different native forms.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering(s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A computer system comprising a computer resources set, a controller kernel and a first guest operating system, wherein:

the computer resources set comprises a computer processing resources set;

the controller kernel is stored and programmed to run on the computer processing resources set;

the first guest operating system is programmed and stored to run under the control of the controller kernel;

the computer resources set defines a native form for instructions that the computer resources set receives from and sends to operating systems;

the controller kernel comprises an instruction communication module;

the instruction communication module is programmed so that the instructions communicated through the controller kernel between the first guest operating system and the computer resources set remain in the native form;

the controller kernel further comprises a frame buffer module which comprises a frame buffer incoming capture sub-module and a frame buffer outgoing capture sub-module;

the frame buffer outgoing capture sub-module is programmed to capture selected output native form frame buffers, from the instruction communication module, that include remote desktop information in order to send the output native form frame buffers out over a communication network; and the frame buffer incoming capture sub-module is programmed to receive selected native form input frame buffers from the communication network and output the received native form input frame buffers to the instruction communication module;

wherein:

wherein the computer resources set comprises a central processing unit.

2. The system of claim 1 wherein the controller kernel is a Portable Operating System Interface type controller kernel.

3. The system of claim 1 wherein the instruction communication module of the controller kernel is further programmed to include an idle loop for temporarily storing native form instructions as they are communicated through the controller kernel between the first guest operating system and the computer resources set.

4. The system of claim 1 wherein:

the frame buffer module further comprises a frame buffer encapsulation sub-module and a frame buffer de-encapsulation sub-module;

the frame buffer encapsulation sub-module is programmed to receive frame buffers from the frame buffer outgoing capture sub-module, to encapsulate the received frame buffers with a network protocol, and to output the encapsulated frame buffers out over the communication network; and the frame buffer de-encapsulation sub-module is programmed to receive encapsulated frame buffers from the communication network, to de-encapsulate the received frame buffers remove a network protocol, and to output the de-encapsulated frame buffers to the frame buffer incoming capture sub-module.

5. The system of claim 4 wherein the network protocol comprises at least one of the following: the Transmission Control Protocol (TCP) is one of the core protocols of the Internet Protocol or Hypertext Transfer protocol.

6. The system of claim 5 wherein the communication network is the internet.

7. The system of claim 1 further comprising remote desktop software programmed to run on and under the control of the first guest operating system, the remote desktop operating software being programmed to: (i) process data to be included in frame buffers to be output through the frame buffer outgoing capture sub-module of the frame buffer module of the controller kernel; and (ii) process data included in frame buffers received from a remote machine through the frame buffer incoming capture sub-module of the frame buffer module of the controller kernel.

8. The system of claim 7 wherein the remote desktop software comprises:

a user interface module;
a privileges and passwords database;
a receive end remote computer interface module; and
a send end remote computer interface module.

9. The system of claim 7 wherein the remote desktop software comprises:

a receive end display in module; and
a send end display out module.

10. The system of claim 9 wherein the remote desktop software further comprises:

a receive end mouse out module;
a send end mouse in module;
a receive end keyboard in module; and
a send end keyboard out module.

11. The system of claim 10 wherein the remote desktop software further comprises:

a receive end audio in module; and
a send end audio out module.

12. The system of claim 1 further comprising a second guest operating system, wherein:

the second guest operating system is programmed and stored to run under the control of the controller kernel;

the first guest operating system and the second guest operating system are containerized with respect to each other; and the instruction communication module is further programmed so that instructions communicated through the controller kernel between the second guest operating system and the computer resources set remain in the native form.

13. A tangible computer storage medium having stored thereon controller kernel software, in computer readable form, for use in a computer system comprising a communications network, a computer resources set, and a first guest operating system, with: (i) the computer resources set comprising a computer processing resources set, and (ii) the computer resources set defining a native form for instructions that the computer resources set receives from and sends to operating systems, wherein:

the controller kernel is programmed to run on the computer processing resources set;

the controller kernel is programmed to run the first guest operating system on the controller kernel under the control of the controller kernel;

the controller kernel comprises an instruction communication module that is programmed to communicate instructions through the controller kernel between the first guest operating system and the computer resources set remain in the native form;

the controller kernel further comprises a frame buffer module which comprises a frame buffer incoming capture sub-module and a frame buffer outgoing capture sub-module;

the frame buffer outgoing capture sub-module is programmed to capture selected native form output frame buffers, from the instruction communication module, that include remote desktop information in order to send the native form output frame buffers out over a communication network; and the frame buffer incoming capture sub-module is programmed to receive selected native form input frame buffers from the communication network and output the received native form input frame buffers to the instruction communication module.

14. The medium of claim 13 wherein the instruction communication module of the controller kernel is further programmed to include an idle loop for temporarily storing native form instructions as they are communicated through the controller kernel between the first guest operating system and the computer resources set.

15. The medium of claim 13 wherein:
the frame buffer module further comprises a frame buffer encapsulation sub-module and a frame buffer de-encapsulation sub-module;
the frame buffer encapsulation sub-module is programmed to receive frame buffers from the frame buffer outgoing capture sub-module, to encapsulate the received frame buffers with a network protocol, and to output the encapsulated frame buffers out over the communication network; and
the frame buffer de-encapsulation sub-module is programmed to receive encapsulated frame buffers from the communication network, to de-encapsulate the received frame buffers remove a network protocol, and to output the de-encapsulated frame buffers to the frame buffer incoming capture sub-module.

* * * * *